UNITED STATES PATENT OFFICE.

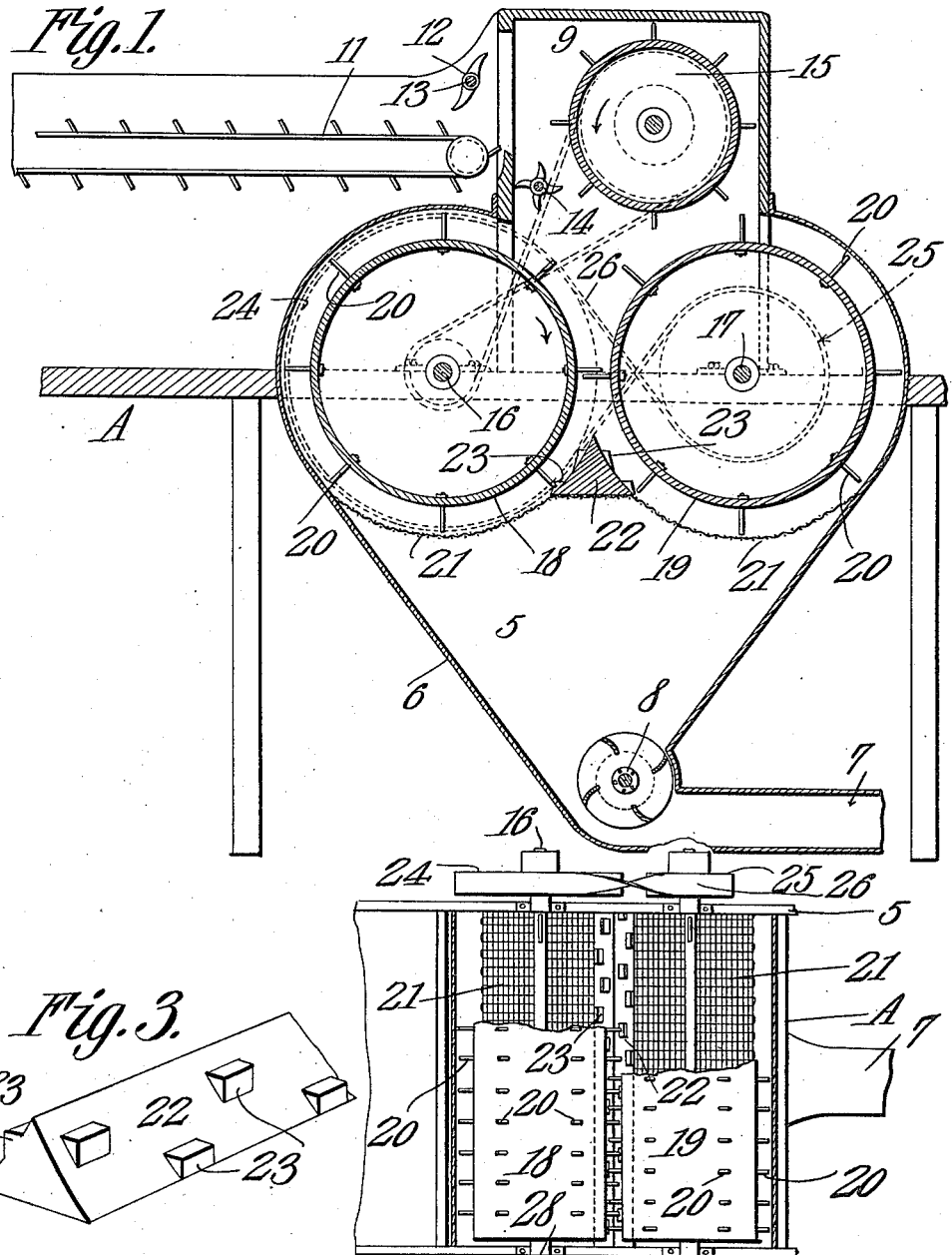

WALTER MIKS, OF MAYFIELD, KANSAS.

ALFALFA-FEED CUTTER AND GRINDER.

1,024,413.  Specification of Letters Patent.  Patented Apr. 23, 1912.

Application filed September 28, 1908. Serial No. 454,988.

*To all whom it may concern:*

Be it known that I, WALTER MIKS, a citizen of the United States, residing at Mayfield, in the county of Sumner and State of Kansas, have invented a new and useful Alfalfa-Feed Cutter and Grinder, of which the following is a specification.

The device herein disclosed is adapted to be employed for cutting and grinding alfalfa and like forage crops, and the invention aims to provide a machine of this type embodying a novel arrangement of beaters, positioned in a novel manner with respect to a delivery conveyer, with respect to the cutting cylinders, and with respect to the concave; whereby a high degree of efficiency in operation will be obtained.

In the accompanying drawings:—Figure 1 is a vertical sectional view through a feed-cutter constructed in accordance with my invention, and Fig. 2 is a horizontal sectional view therethrough, the cylinders being shown in plan and being partly broken away to disclose the screens of the feed-cutter. Fig. 3 is a detail perspective view of a portion of the screen supporting bar.

As shown in the drawings, the feed-cutter embodying my invention is mounted in a frame which is indicated in general by the reference character "A", and may be of any suitable construction, the cutting cylinders, and, in fact, the major portion of the mechanism of the cutter, being housed in a hopper which is arranged in the said frame, the side walls of the hopper being indicated by the numeral 5, and the downwardly converged end walls by the numeral 6, said hopper terminating at its lower end in a laterally extending spout 7, through which the cut and ground feed is to be blown by means of a fan 8, mounted in the hopper at the said lower end thereof. The frame "A" also supports a housing 9, provided in one side wall with an opening 10, through which the feed to be cut is to be introduced, an endless conveyer, of conventional form, 11, being arranged to that side of the said housing 9 in which the opening 10 is provided, it being understood that the feed to be cut and ground is placed or thrown upon this conveyer 11 and is carried thereby to the opening 10, it being forced or beaten through the opening by a beater 12 upon a beater shaft 13, journaled immediately in advance of the said opening. Another beater-shaft 14 is journaled just below the lower edge of the opening 10 and within the housing 9 and the beaters upon the latter shaft serve to force the hay or the like down into the machine after it has been fed through the opening 10, there being also provided, for this purpose, a beater drum 15, which drum is located within the housing 9 and opposite the opening 10 in the wall of the housing.

Shafts, 16 and 17, are journaled in the sides 5 of the hopper and upon these shafts respectively are fixed drums or cylinders 18 and 19 which are provided with teeth or cutting fingers 20. The two cylinders 18 and 19 are mounted opposite each other and in close proximity, so that as they are rotated, the teeth on one pass between the teeth on the other. The feeding mechanism embodying the beaters and conveyer is arranged so as to discharge the hay into the machine at a point between the two cutting cylinders, and, as will presently be explained, these cylinders are to be rotated toward each other, one faster than the other.

As shown, in Fig. 1 of the drawings, the walls 6 of the hopper are curved at their upper portions to inclose the respective cylinders, and, in order to completely inclose the cylinders and to provide for the sifting of the feed, a curved screen sheet 21 is secured at its outer edges to the walls 6 of the hopper, and at its center face or base to the lower edges of a bar 22, which is substantially triangular in cross section and which extends from one to the other of the walls 5 of the hopper and between the cylinders 18 and 19, but in a plane below the plane in which their shafts are located, the inclined sides of the bar being substantially tangential to the circles described by the points of the cylinder teeth.

From the foregoing it will be seen that sufficient room is left for the hay to be fed between the cylinders, but that beyond this the cylinders are inclosed or closely enveloped each in a separate casing.

The hay, in its passage between the cylinders, is cut or beaten into small lengths or fragments, and, in order to provide for grinding of the hay, I form the bar 22 with teeth 23, which are located upon the inclined sides of the bar, and preferably in staggered relation, so that the teeth upon the cylinders will pass between them as the cylinders are rotated.

Pulleys, 24 and 25, are fixed upon the shafts 16 and 17 respectively and a belt 26 is trained over the pulleys, the pulley 25 being of less diameter than the pulley 24, so that the cylinder 19 will be rotated at a higher rate of speed than the cylinder 18. A belt 27 is passed over a pulley 28 fixed upon the shaft 16 and over a power pulley (not shown).

From the foregoing description of my invention it will be understood that hay or the like is placed upon the conveyer 11 and is fed into the machine and between the two cylinders 18 and 19. In its passage between these cylinders the hay is cut into bits or short lengths and is finally ground by the coöperation of the cylinder teeth with the teeth upon the bar, the ground feed being then agitated by the cylinder teeth and caused to sift through the screen. Finally it is blown by the fan 8, out through the discharge spout 7.

It is to be noted that the cylinders 18 and 19 rotate toward each other. Moreover, the primary cylinder 19 rotates at a higher rate of speed than does the secondary cylinder 18. Owing to this fact, there will be an accumulation of material below the cylinder 19, above the fan 8, and at the base of that wall 6 which serves as a guide for the cylinder 19. A clogging up of the device due to the uneven depositing of material, resulting from the more rapid rotation of the primary cylinder 19, will be avoided, owing to the fact that, as clearly shown in Fig. 1, the fan 8 is adapted to rotate in a common direction with the more rapidly rotating primary cylinder 19. The fan 8, being journaled close to that wall 6 which receives the material from the cylinder 19, will urge the material from beneath the cylinder 19, and maintain the cut material in the hopper at an even level.

Having described my invention, what I claim and desire to secure, by Letters Patent, is:—

1. In a device of the class described, a housing provided with an opening; a conveyer positioned to discharge into the housing, through the opening; a beater supported for rotation above one end of the conveyer, and upon the outside of the housing, adjacent the top of the opening; a second beater supported for rotation inside of the housing, adjacent the bottom of the opening; a third beater supported for rotation in the housing opposite the opening, and above the second beater; and cutting mechanism within the housing, below the second and third beaters.

2. In a device of the class described, a housing having an opening; means upon the outside of the housing for delivering the material through the opening; a beater supported for rotation in the housing, below the opening; a second beater, of larger diameter than the first, supported for rotation above the first beater, and located opposite to the opening; cutting cylinders supported for rotation in the housing below the beaters; and a concave located between the cylinders, and positioned directly beneath the second beater.

In testimony that I claim the foregoing as my own, I have hereto affixed my signature in the presence two witnesses.

WALTER MIKS.

Witnesses:
 JOHN J. PITTS,
 GEO. W. LOCKE.

---

Copies of this patent may be obtained for five cents each, by addressing the "Commissioner of Patents, Washington, D. C."